June 17, 1952      M. CHURCH      2,600,968
GRAPHIC METHOD OF TEACHING MUSIC
Filed June 30, 1949
Mary Church, INVENTOR.
BY Kenway, Jenney, Witter & Hildreth, Attys.

UNITED STATES PATENT OFFICE 2,600,968

GRAPHIC METHOD OF TEACHING MUSIC

Mary Church, Cambridge, Mass.

Application June 30, 1949, Serial No. 102,173

1 Claim. (Cl. 84—470)

This invention relates to a graphic method of teaching music and more particularly to the teaching of piano playing. It is well known that the first requisite of successful playing resides in being able to read written music readily and accurately, and my invention is more particularly concerned with this fact. To read music successfully and translate the notes to the instrument, the pupil must learn to read ahead of the notes being played. This requires the ability to both read and memorize speedily and accurately and the primary object of my invention resides in a novel method for promoting this faculty.

I have discovered that the pupil acquires this ability when subjected to reading music wherein the musical composition is placed in front of the pupil and is so progressively blanked out that he is always playing from memory notes which he has just previously read from the composition. In accordance with my invention, I project a plurality of consecutive measures or sections of the musical composition onto a screen in view of the pupil and, as the pupil plays, the foremost sections are consecutively blanked out by changing the projection so that the pupil is always playing the notes that have just previously been eliminated. In each successive projection, the foremost measure or section of the previous projection is eliminated and the projections are changed in a frequency corresponding to the time period of the composition, each projection being placed on the screen for a time period equal approximately to the measure or section last eliminated. Thus the pupil not only learns to memorize and play from memory but also acquires perfect timing.

These and other features of the invention will be more readily understood and appreciated from the following detailed description of a preferred embodiment thereof, selected for purposes of illustration and shown in the accompanying drawings in which—

Fig. 1 illustrates the projection of a piece of music to be played,

Fig. 2 illustrates the next succeeding projection, and

Fig. 3 illustrates the next succeeding projection.

My invention contemplates a graphic method of teaching music by employing a film embodying a succession of frames from which the music is projected progressively onto a screen in view of the pupil, it being understood that the screen may occupy the rack or place usually employed for holding the music book or composition or any position in full view of the pupil. The first frame and projection embodies all or the first portion of the composition to be played, as illustrated in Fig. 1 of the drawing. When the pupil is ready to play, the first projection is removed from the screen and the second projection (Fig. 2) is substituted therefor. It will be noted that in Fig. 2 measure #1 has been eliminated. The pupil plays the first measure #1 of the composition while the second projection is on the screen and he simultaneously therewith reads measure #2 preparatory to playing it in proper timed sequence following the playing of the first measure.

The second projection (Fig. 2) is held on the screen for a time period equal approximately to that of measure #1. The second projection is then in like manner removed and the third projection (Fig. 3) is substituted therefor, and the pupil plays measure #2 while reading measure #3 preparatory to playing it following the completion of measure #2. Thus in like manner the pupil continues on through the composition, always playing the next previous measure from memory while reading the measure which is immediately to follow. When the last measure #8 is removed from the screen and is being played the next succeeding portion of the composition will be projected onto the screen preparatory to continuing on in like manner.

While, as illustrated and above described, the composition will ordinarily be broken up into full measures, I desire it to be understood that it may be desirable in some cases to break it into sections other than complete measures. In any event, the method of procedure is the same, the pupil always playing from memory the notes just previously read and simultaneously therewith reading the notes in the section immediately following. In this manner the pupil learns rapidly to read ahead and he acquires the ability to play from memory and by touch while reading and grasping the next succeeding section to be played.

The projections are changed at a rate corresponding to the playing time period of the composition so that the pupil acquires not only the ability to memorize and play from memory but also the ability to play with perfect timing.

It is well known that rapid reading and the ability to translate the notes to the instrument are the first requirements in successful playing of music. It will furthermore be apparent that the employment of visual means, as the film, projection and screen of my novel method, together with proper timing, directly aids the pupil to acquire the requisites of good playing. These include:

1. Note reading for acquiring speed and accurate identification of notes,
2. Rhythm reading in both reading and translating of the notes to the instrument,
3. Superior keyboard command wherein the pupil becomes able to play mainly by the sense of touch, that is, without looking at the keys, and
4. Aid in better reading and understanding of musical compositions.
5. Perfect timing.

Having thus disclosed my invention what I claim as new and desire to secure by Letters Patent is:

A method of teaching instrumental music which consists in projecting a plurality of consecutive equal sections of a musical composition onto a screen in sight-reading view of the pupil, consecutively changing the projections at a frequency leaving each projection on the screen for a time period equal to the timing of one of said sections of the composition, and eliminating in each succeeding projection the foremost section of the next preceding projection, whereby each memorized sight-read section of the composition may be instrumentally reproduced by the pupil simultaneously and in equal time period with the sight-reading of the next succeeding section of the composition.

MARY CHURCH.

REFERENCES CITED

The following references are of record in the file of this patent:

UNITED STATES PATENTS

| Number    | Name             | Date           |
|-----------|------------------|----------------|
| 1,428,995 | Springefeld et al. | Sept. 12, 1922 |
| 2,123,258 | Ranger           | July 12, 1938  |
| 2,252,726 | Peck             | Aug. 19, 1941  |
| 2,357,593 | Leavell          | Sept. 5, 1944  |
| 2,535,243 | Taylor           | Dec. 26, 1950  |